(12) United States Patent
Nakamura

(10) Patent No.: US 11,227,413 B2
(45) Date of Patent: Jan. 18, 2022

(54) IMAGE DISPLAY SYSTEM

(71) Applicant: SUNCORPORATION, Konan (JP)

(72) Inventor: Yasuhiro Nakamura, Konan (JP)

(73) Assignee: SUNCORPORATION, Konan (JP)

( * ) Notice: Subject to any disclaimer, the term of this patent is extended or adjusted under 35 U.S.C. 154(b) by 0 days.

(21) Appl. No.: 16/497,710

(22) PCT Filed: Mar. 27, 2017

(86) PCT No.: PCT/JP2017/012458
§ 371 (c)(1),
(2) Date: Sep. 25, 2019

(87) PCT Pub. No.: WO2018/179069
PCT Pub. Date: Oct. 4, 2018

(65) Prior Publication Data
US 2021/0118191 A1 Apr. 22, 2021

(51) Int. Cl.
*G06F 3/041* (2006.01)
*G06T 11/00* (2006.01)
(Continued)

(52) U.S. Cl.
CPC .......... *G06T 11/00* (2013.01); *G02B 27/0172* (2013.01); *G06F 3/0416* (2013.01);
(Continued)

(58) Field of Classification Search
CPC .. G06F 3/018; G06F 3/04883; G06F 3/04886; G06F 3/011; G06F 3/014;
(Continued)

(56) References Cited

U.S. PATENT DOCUMENTS

2010/0156787 A1 6/2010 Katayama
2010/0225566 A1 9/2010 Sato
(Continued)

FOREIGN PATENT DOCUMENTS

JP 2005043954 A 2/2005
JP 2009015720 A 1/2009
(Continued)

OTHER PUBLICATIONS

Written Opinion for PCT/JP2017/012458 dated May 16, 2017 (English translation).
(Continued)

*Primary Examiner* — Insa Sadio
(74) *Attorney, Agent, or Firm* — K&L Gates LLP

(57) ABSTRACT

An operation device sends first position information indicating a first relative position and operation information indicating an operation inputted to the accepting unit to an image display device. The image display device acquires the first position information and the operation information from the operation device and creates display image data representing a display image based on captured image data representing a captured image within a specific range and the first relative position indicated by the first position information. In the display image, a panel image is arranged in a range corresponding to a position of the accepting unit within the specific range, and a visibility of the panel image within a first range corresponding to the first relative position is lower than the visibility of the panel image outside the first range.

10 Claims, 11 Drawing Sheets

(51) Int. Cl.
*G06T 7/73* (2017.01)
*G02B 27/01* (2006.01)
*G06F 3/0488* (2013.01)

(52) U.S. Cl.
CPC ............ *G06F 3/04886* (2013.01); *G06T 7/73* (2017.01); *G02B 2027/0138* (2013.01); *G06F 2203/04104* (2013.01); *G06T 2207/30204* (2013.01)

(58) Field of Classification Search
CPC ............ G06F 3/0304; G02B 2027/014; G02B 2027/0178; G02B 2027/0187; G02B 27/017; G02B 27/0179
See application file for complete search history.

(56) References Cited

U.S. PATENT DOCUMENTS

| | | | |
|---|---|---|---|
| 2012/0120066 A1 | 5/2012 | Hirota | |
| 2014/0232747 A1 | 8/2014 | Sugimoto et al. | |
| 2014/0313140 A1* | 10/2014 | Imine | G06F 3/04883 345/173 |
| 2015/0123895 A1 | 5/2015 | Takano | |
| 2015/0378599 A1 | 12/2015 | Lee et al. | |
| 2016/0317915 A1* | 11/2016 | Onda | A63F 13/2145 |

FOREIGN PATENT DOCUMENTS

| | | | |
|---|---|---|---|
| JP | 4574323 | B2 | 11/2010 |
| JP | 5012781 | B2 | 8/2012 |
| JP | 5201015 | B2 | 6/2013 |
| JP | 5262681 | B2 | 8/2013 |
| JP | 5273323 | B1 | 8/2013 |
| JP | 5293154 | B2 | 9/2013 |
| JP | 5300825 | B2 | 9/2013 |
| JP | 5428943 | B2 | 2/2014 |
| JP | 2014131094 | A | 7/2014 |
| JP | 2014154074 | A | 8/2014 |
| JP | 5696908 | B2 | 4/2015 |
| JP | 2015090530 | A | 5/2015 |

OTHER PUBLICATIONS

International Search Report for PCT/JP2017/012458 dated May 17, 2017.

* cited by examiner

IMAGE DISPLAY SYSTEM

CROSS-REFERENCE TO RELATED APPLICATIONS

This application is a U.S. National Stage Entry under 35 U.S.C. § 371 of International Patent Application No. PCT/JP2017/012458, filed Mar. 27, 2019, the entire disclosure of which is hereby incorporated by reference herein.

TECHNICAL FIELD

The art disclosed herein relates to an image display system for displaying a panel image indicating an operation panel.

BACKGROUND ART

For example, Japanese Patent No. 4574323 describes a mixed reality feeling presentation system that superposes an image of a virtual space on an image of a real space including a touch panel and displays the same. Here, when the real space image includes a skin-colored region such as a finger of a user operating the touch panel, the image of the virtual space is not superposed on this region.

SUMMARY OF INVENTION

Technical Problem

In the art described as above, since the aforementioned region is detected based on colors, a restriction is cast upon design of the system to prevent erroneous detection. Specifically, for example, a color of the touch panel is restricted to a color that differs greatly from a color of the finger of the user (that is, a skin color). Further, there also is a possibility that the aforementioned region may not be detected when an apparent color of the finger is different from the skin color, such as when the user is wearing a glove. Due to this, it is difficult to adapt the aforementioned system to work which requires wearing gloves.

The description herein discloses an art that reduces restrictions on design of an image display system configured to display an image in which a visibility of a range corresponding to a position of a finger of a user is lowered.

Solution to Technical Problem

An image display system may comprise an operation device and an image display device communicably connected with the operation device. The operation device may comprise: a body; an accepting unit exposed on a surface of the body and configured to accept an operation inputted by a finger of a user; a detecting unit configured to detect a first relative position of a first finger of the user relative to the accepting unit; and an operation-side controller configured to send first position information indicating the first relative position detected by the detecting unit and operation information indicating the operation inputted to the accepting unit to the image display device. The image display device may comprise: a frame wearable on a head of the user; a display unit mounted on the frame and arranged on a position facing an eye of the user wearing the frame; a camera configured to capture a specific range corresponding to a view range of the user; and a display-side controller. The display-side controller may comprise: an acquiring unit configured to acquire the first position information and the operation information from the operation device; a creating unit configured to create display image data representing a display image including a panel image indicating an operation panel for inputting a specific operation, based on captured image data representing a captured image within the specific range and the first relative position indicated by the acquired first position information, wherein in the display image, the panel image is arranged in a range corresponding to a position of the accepting unit within the specific range, and a visibility of the panel image within a first range corresponding to the first relative position of the first finger is lower than the visibility of the panel image outside the first range; a display controller configured to cause the display unit to display the display image represented by the display image data; and a specific process executing unit configured to execute a specific process according to the specific operation in a case where specific operation information is acquired while the display image is displayed, the specific operation information indicating that an input of the specific operation has been accepted on the accepting unit.

According to the above configuration, the image display device displays the display image based on the captured image data and the first relative position of the first finger detected by the operation device. In the display image, the visibility of the panel image within the first range corresponding to the first relative position is lower than the visibility of the panel image outside the first range. In such a portion with a low visibility, the user is capable of visually recognizing his/her first finger through this portion. The user is thus allowed to recognize a position of his/her first finger while seeing the panel image. Since the first relative position of the first finger is detected by the detecting unit of the operation device not by being based on a color of the first finger, a color of the accepting unit of the operation device is not restricted. Further, since an apparent color of the first finger may be any color, the image display system of the present application can be employed in work which requires wearing gloves. That is, in the image display system configured to display the image in which the visibility of the range corresponding to the position of the finger of the user, restrictions on design of the image display system can be reduced.

The detecting unit may be further configured to detect a second relative position of a second finger of the user relative to the accepting unit. The operation-side controller may be further configured to send second position information indicating the second relative position detected by the detecting unit to the image display device. The acquiring unit may be further configured to acquire the second position information from the operation device. The creating unit may create the display image data based on the captured image data, the first relative position, and the second relative position indicated by the acquired second position information. In the display image, the visibility of the panel image within the first range and a second range corresponding to the second relative position of the second finger may be lower than the visibility of the panel image outside both the first range and the second range.

According to this configuration, the user who sees the display image can easily imagine the positions of the first and second fingers in the display image. The user can perform operations while recognizing respective positions of plural fingers. Due to this, operability for the user to perform the specific operation on the accepting unit is improved.

The detecting unit may be further configured to detect a second relative position of a second finger of the user relative to the accepting unit. The operation-side controller may be further configured to send second position information indicating the second relative position detected by the detecting unit to the image display device. The acquiring unit may be further configured to acquire the second position information from the operation device. The display-side controller may further comprise a finger specifying unit configured to specify the first finger that is more likely to be used for an operation from among the first finger and the second finger based on the first position information and the second position information. In the display image, the visibility of the panel image within a second range corresponding to the second relative position of the second finger that is not specified may be equal to the visibility of the panel image outside both the first range and the second range.

According to this configuration, in the display image, the visibility within the first range corresponding to the first finger, which is highly likely to be used for operation, is set low, and the visibility of the second range corresponding to the second finger not set low. Due to this, the user can perform operation while visually recognizing ranges within the panel image other than the first range corresponding to the first finger, which is highly likely to be used for operation, regardless of a positional relationship of the respective fingers of the user relative to the operation device. Due to this, the visibility in the panel image is suppressed from being excessively lowered by the respective fingers of the user, and the operability for the user is improved.

The display unit may be constituted of a translucent material. The creating unit may create the display image data satisfying at least one of following conditions: (a) a brightness of the panel image within the first range is lower than the brightness of the panel image outside the first range; (b) the panel image within the first range is displayed in a single color of black; (c) a saturation of the panel image within the first range is lower than the saturation of the panel image outside the first range; and (d) the panel image within the first range is trimmed.

The panel image may include one or more character images associated with the operation panel. In the display image, the one or more character images may be displayed in a visible form regardless of whether the one or more character image are arranged within the first range or not.

According to this configuration, the user who sees the display image can visually recognize the one or more character images within the panel image regardless of the position of the first finger, thus the operability is improved.

Here, a character included in the "character image" may include hiragana, katakana, kanji (Chinese characters), alphabets, numbers, symbols, and further pictorial characters (such as pictograms).

The operation panel may include a plurality of buttons arranged adjacent to each other. The panel image may include a plurality of button images corresponding to the plurality of buttons.

Among the plurality of buttons in the display image, a visibility of an image indicating a specific button arranged at the first relative position may be lower than a visibility of an image indicating a button adjacent to the specific button.

According to this configuration, the user who sees the display image can easily imagine the position of the first finger within the display image based on a difference between the visibilities of the images indicating the respective buttons, thus the operability for the user is improved.

The specific operation may include an operation for selecting a specific button from among the plurality of buttons. The creating unit may change the display image data in a case where the specific operation information is acquired while the display image is displayed so as to create a changed display image data representing a changed display image. In the changed display image, a displayed form of an image representing the specific button may have been changed.

According to this configuration, the user can easily recognize which one of the plurality of buttons was operated.

Here, the "displayed form of the image" includes a color of the image and a size and a shape of a character included in the image.

The operation device may further comprise a marker arranged on a surface of at least one of the body and the accepting unit. The display-side controller may further comprise a position specifying unit, in a case where the captured image includes a marker image indicating the marker, configured to specify a position and a posture of the accepting unit within the specific range based on a position and a posture of the marker image in the captured image. The creating unit, in the case where the captured image includes the marker image, may create the display image data based on the captured image data, the first relative position, and the specified position and posture of the accepting unit.

According to this configuration, the image display system can arrange and display the panel image in a form matching the position and posture of the accepting unit of the operation device.

The specific process executing unit, even in a case where the specific operation information is acquired while the display image is displayed, may not execute the specific process in a case where the captured image does not include the marker image.

In the case where the captured image does not include the marker image, the position and posture of the accepting unit cannot be specified based on the position and posture of the marker image, thus there is a possibility that the panel image may not be arranged appropriately in a range corresponding to the position of the accepting unit of the operation device. That is, there is a possibility that the panel image is arranged by being displaced relative to the accepting unit. According to this configuration, erroneous operation can be suppressed since the input of the specific operation is invalidated when the captured image does not include the marker image.

A control method, a computer program, and a computer-readable medium storing the computer program for realizing the aforementioned image display system are also novel and useful.

BRIEF DESCRIPTION OF DRAWINGS

FIRST EMBODIMENT (Configuration of Image Display System 2; FIG. 1)

Figure 1:
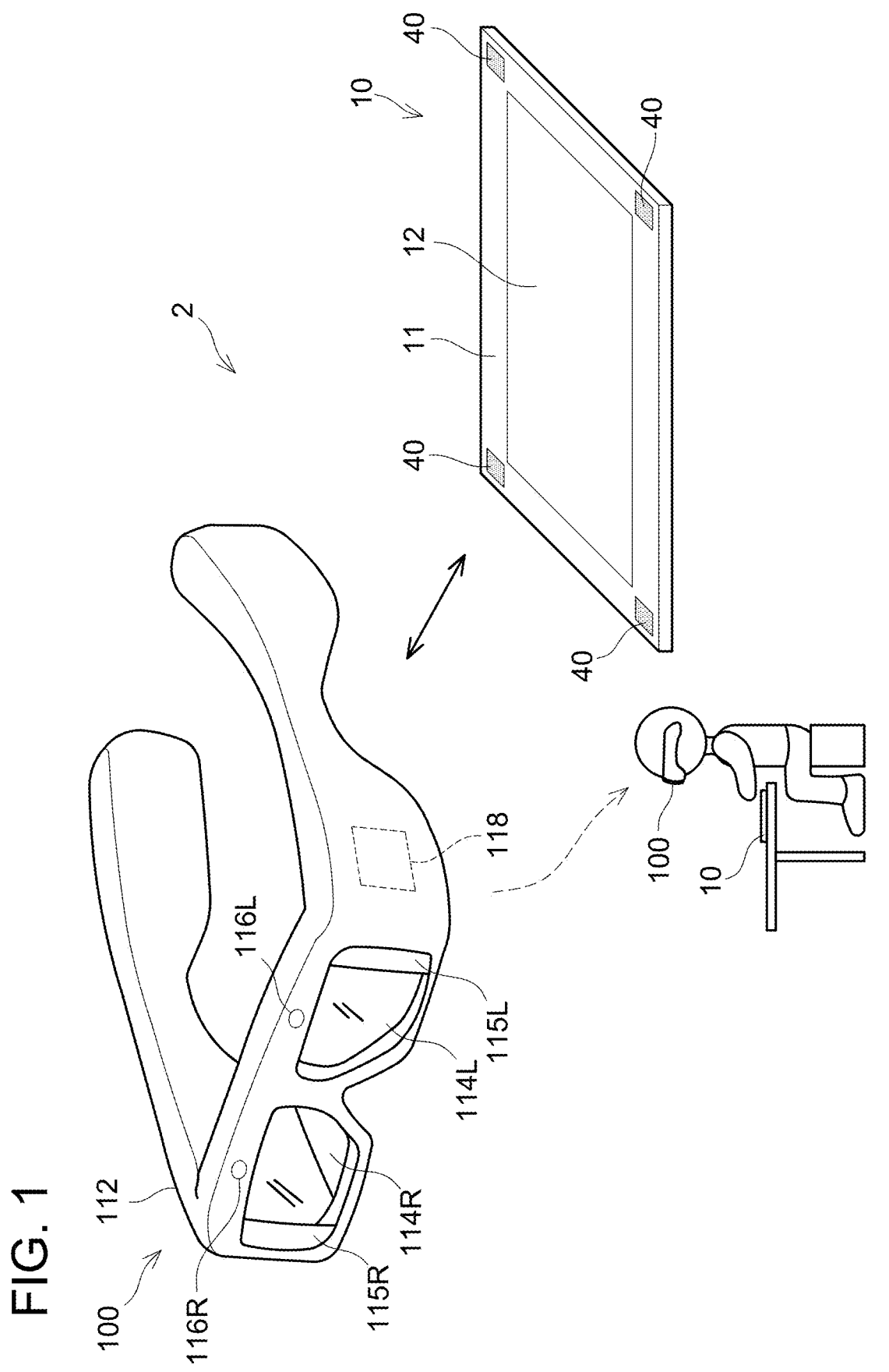
FIG. 1 shows an overview of an image display system.

An image display system 2 shown in FIG. 1 is a system for displaying a panel image indicating an operation panel for a user to input an operation. The image display system 2 comprises an operation device 10 and an image display device 100. The operation device 10 and the image display device 100 are wirelessly connected and are configured to execute wireless communication with each other.

Figure 2:
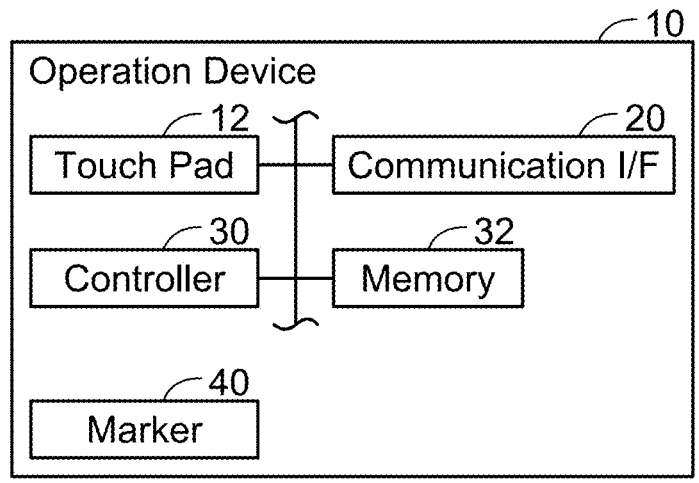
FIG. 2 shows a block diagram of an operation device.

(Configuration of Operation Device 10; FIGS. 1 and 2)

The operation device 10 is a device having a plate-like shape for the user to input an operation. The operation device 10 is provided with a body 11, a touch pad 12, a communication interface 20, a controller 30, a memory 32, and four markers 40. Hereinbelow, an interface will be denoted as "I/F".

The touch pad 12 is exposed on a surface of the body 11, and is configured to accept an input of an operation. The touch pad 12 is provided with an electrostatic capacitance or electric field sensor. The touch pad 12 is configured to detect a relative position of a finger (specifically, coordinates in vertical and lateral directions on a surface of the touch pad 12 and a coordinate in a height direction from the surface of the touch pad 12) relative to the touch pad 12 by using the sensor when the finger of the user approaches or contacts the touch pad 12, and supplies the relative position to the controller 30.

The communication I/F 20 is an I/F for executing wireless communication with the image display device 100. The wireless communication may for example be communication according to a Wi-Fi scheme, or may be communication according to a Bluetooth (registered trademark) scheme. In a variant, the communication I/F 20 may be an I/F for executing wired communication through a wired cable with the image display device 100.

The controller 30 is configured to execute various processes including a process to be described later (see FIG. 4) according to programs stored in the memory 32. Further, the controller 30 is electrically connected to the touch pad 12, the communication I/F 20, and the memory 32, and is configured to control operations of these elements.

The memory 32 stores various programs. Further, the memory 32 is provided with a storage region for temporarily storing various types of information to be acquired in a course of executing the process of FIG. 4 to be described later.

The four markers 40 are provided on a surface of one of the body 11 and the touch pad 12. The four markers 40 are provided at four corners of the body 11. The respective markers 40 are black-colored squares. In a variant, the respective markers 40 may be a combination of black-colored squares and black-contoured white squares, circles, triangles two-dimensional codes or dot patterns. Further, each of the markers 40 may be a light emitting body having a predetermined shape. Further, the four markers 40 may be provided at positions closer to a center of the body 11 than the four corners of the body 11. Further, a number of the markers 40 may be three or less or may be five or more. For example, one ring-shaped marker 40 may be provided along an outer circumference of the body 11.

Figure 3:
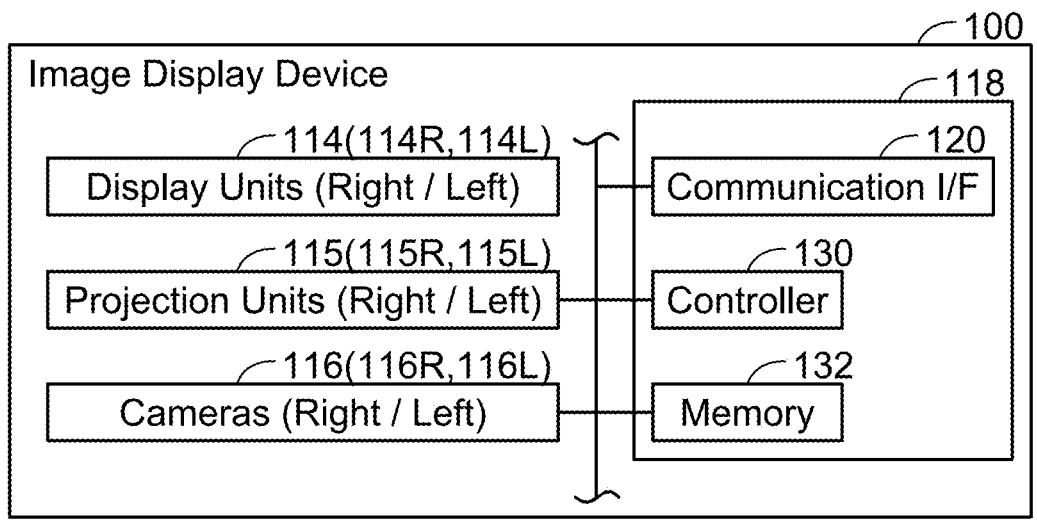
FIG. 3 shows a block diagram of an image display device.

(Configuration of Image Display Device 100; FIGS. 1 and 3)

The image display device 100 is an image display device used by being worn on a head of the user (a so-called head mount display). As shown in FIG. 1, the image display device 100 is provided with a frame 112, a right display unit 114R, a left display unit 114L, a right projection unit 115R, a left projection unit 115L, a right camera 116R, a left camera 116L, and a control box 118.

The frame 112 is a member having a shape like a glassframe. The user can wear the image display device 100 on the head by wearing the frame 112 similarly to wearing glasses.

The right display unit 114R and the left display unit 114L are provided on the frame 112. The right display unit 114R and the left display unit 114L are constituted of translucent display members. When the user wears the image display device 100 on the head, the right display unit 114R is arranged at a position facing the right eye of the user, and the left display unit 114L is arranged at a position facing the left eye of the user. The right display unit 114R and the left display unit 114L each have a half mirror structure, and are configured to reflect light projected from the right projection unit 115R and the left projection unit 115L (that is, light constituting an image) and project the same to the eyes of the user, thus are capable of allowing the eyes of the user to visually recognize the image. Hereinbelow, the right display unit 114R and the left display unit 114L may collectively be termed "display units 114".

The right projection unit 115R and the left projection unit 115L are respectively members for projecting the light representing the image to the right display unit 114R and the left display unit 114L. The right projection unit 115R and the left projection unit 115L are respectively provided at sides of the right display unit 114R and the left display unit 114L. Hereinbelow, the right projection unit 115R and the left projection unit 115L may collectively be termed "projection units 115". In this embodiment, the projection units 115 are configured to project a predetermined virtual image (hereinbelow termed a "display image") from sideways to the display units 114 in accordance with instructions from a controller 130. The display units 114 are configured to reflect the light projected from the projection units 115 and project the same to the eyes of the user. Due to this, the user can see an object (such as the touch pad 12) and/or a space in reality and the display image as if the display image is superposed at a predetermined position of the object and/or in the space in reality which the user can see through the display units 114. In the description herein, descriptions on the projection units 115 may be omitted in explaining about the controller 130 instructing to project an image on the projection units 115 to allow the user to visually recognize that a desired image is displayed on the display units 114, and such may simply be expressed as "the controller 130 causes the display units 114 to display a desired image".

The right camera 116R is a camera arranged at a position on the frame 112 above the right display unit 114R (that is, a position above the right eye of the user). On the other hand, the left camera 116L is a camera arranged at a position on the frame 112 above the left display unit 114L (that is, a position above the left eye of the user). A range corresponding to a range of view of the user who wears the image display device 100 (hereinbelow termed a "specific range") can be captured from different angles respectively by the right camera 116R and the left camera 116L. That is, it can be said that the right camera 116R is configured to capture the range of view of the right eye of the user and the left camera 116L is configured to capture the range of view of the left eye of the user. Further, hereinbelow, the right camera 116R and the left camera 116L may collectively be termed "cameras 116".

The control box 118 is a controller built in a part of the frame 112. The control box 118 accommodates elements that control a control system of the image display device 100. Specifically speaking, the control box 118 accommodates a communication I/F 120, the controller 130, and a memory 132 as shown in FIG. 3. In another example, the control box 118 may be provided separately from the frame 112. In this case, the respective constituent elements in the control box 118 (the communication I/F 120, the controller 130, and the memory 132), and the respective constituent elements provided on the frame 112 (such as the projection units 115 and the cameras 116) simply need to be electrically connected by cables.

The communication I/F 120 is similar to the communication I/F 20. The controller 130 is configured to execute various processes including a display process (see FIG. 7) and an operation process (see FIG. 16) to be described later in accordance with programs stored in the memory 132. Further, the controller 130 is electrically connected to the projection units 115, the cameras 116, the communication I/F 120, and the memory 132, and is configured to control operations of these elements.

The memory 132 stores various programs. Further, the memory 132 stores a storage region for temporarily storing various types of information acquired in courses of executing the display process and the operation process to be described later.

Figure 4:
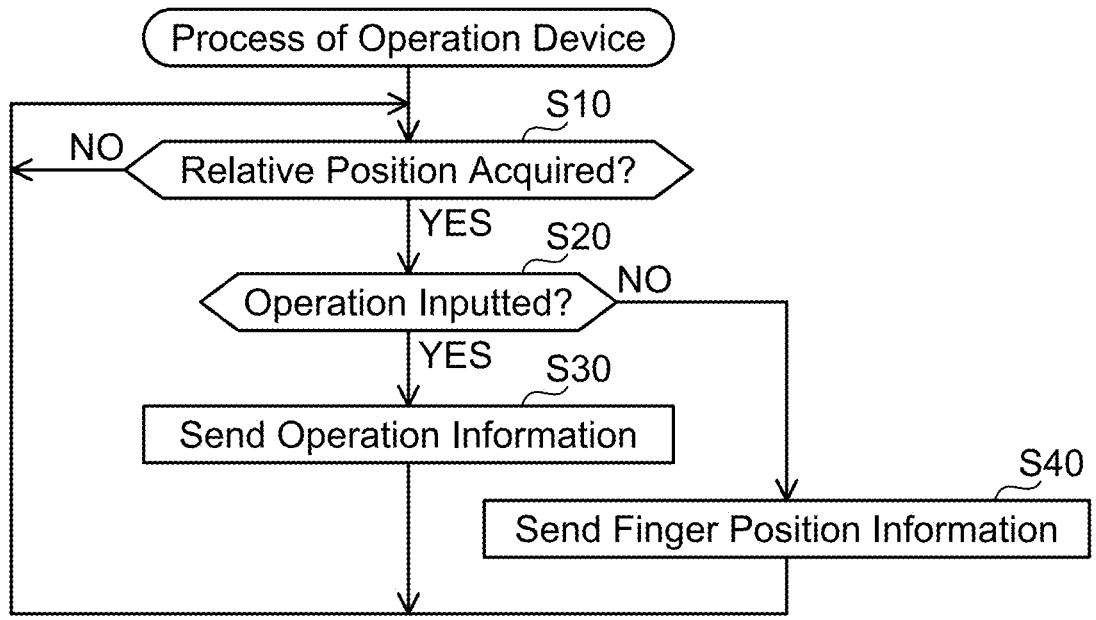
FIG. 4 shows a flowchart of a process executed by a controller of the operation device.

(Process of Operation Device 10; FIG. 4)

A process which the controller 30 of the operation device 10 executes will be described. When a power of the operation device 10 is turned on, the controller 30 starts the process of FIG. 4. In S10, the controller 30 monitors detection of a relative position of a finger relative to the touch pad 12. When a finger of the user enters a detectable range of the touch pad 12 (see FIGS. 5 and 6), the touch pad 12 detects the relative position of the finger relative to the touch pad 12. The touch pad 12 supplies information indicating the detected relative position to the controller 30. When the information indicating the relative position of the detected finger is acquired from the touch pad 12, the controller 30 determines that the relative position is detected (YES to S10), and proceeds to S20.

In S20, the controller 30 determines whether or not an operation input by the user's finger is accepted via the touch pad 12. Specifically, the controller 30 determines whether or not a distance between the finger and the touch pad 12 is shorter than a predetermined distance based on the acquired relative position. When the distance between the finger and the touch pad 12 is shorter than the predetermined distance, the controller 30 determines that the operation input is accepted (YES to S20), and proceeds to S30. On the other hand, when the distance between the finger and the touch pad 12 is equal to or greater than the predetermined distance, the controller 30 determines that the operation input is not accepted (NO to S20), and proceeds to S40.

In S30, the controller 30 sends operation information indicating that a button among a plurality of buttons was selected to the image display device 100 through the communication I/F 20. The operation information includes the detected relative position. When S30 is completed, the controller 30 returns to S10.

Figure 5:
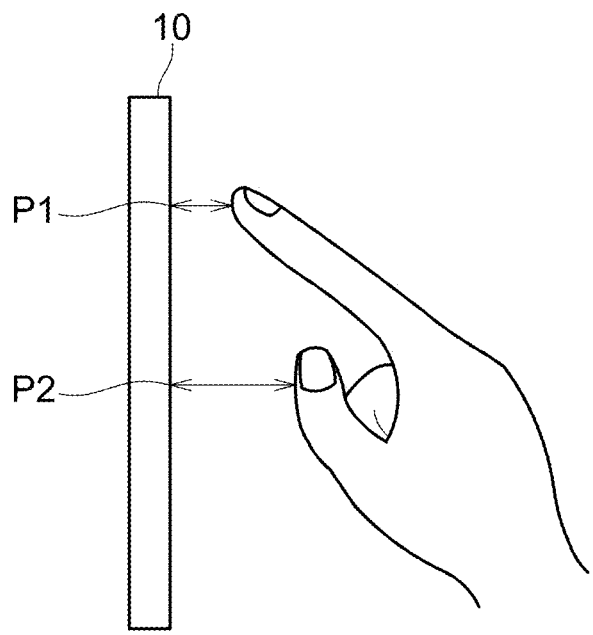
FIG. 5 shows a case where relative positions of two fingers are detected.
Figure 6:
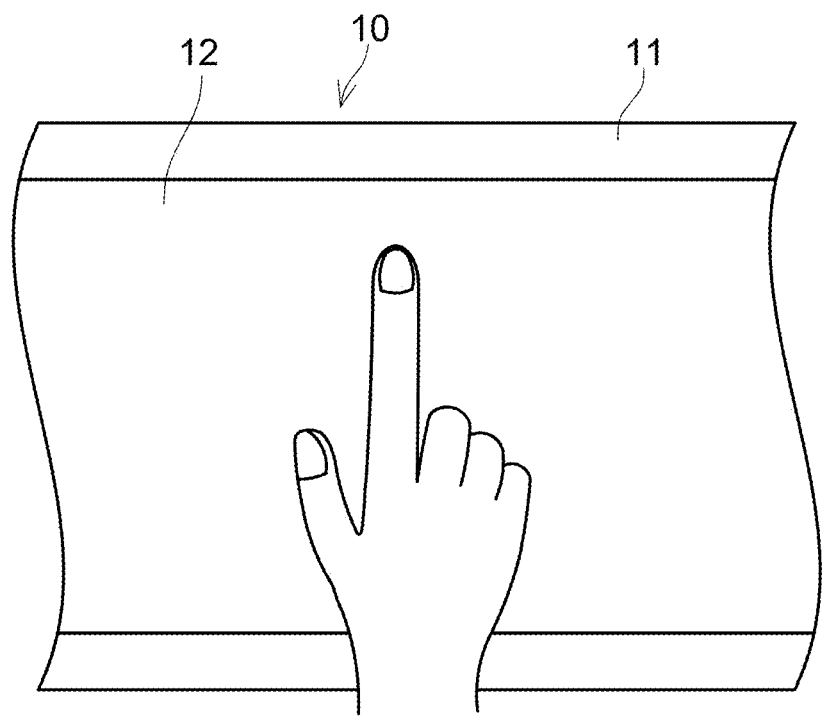
FIG. 6. is a top view corresponding to FIG. 5.

In S40, the controller 30 sends finger position information indicating the detected relative position to the image display device 100 through the communication I/F 20. When S40 is completed, the controller 30 returns to the monitoring in S10. FIGS. 5 and 6 show an example of a case where S40 is executed. In the example of FIGS. 5 and 6, finger position information indicating a relative position P1 of an index finger is sent in S40, after which YES is determined again in S10 and S20, and thereafter finger position information indicating a position P2 of a thumb is sent in S40. When S40 is completed, the controller 30 returns to S10.

Figure 7:
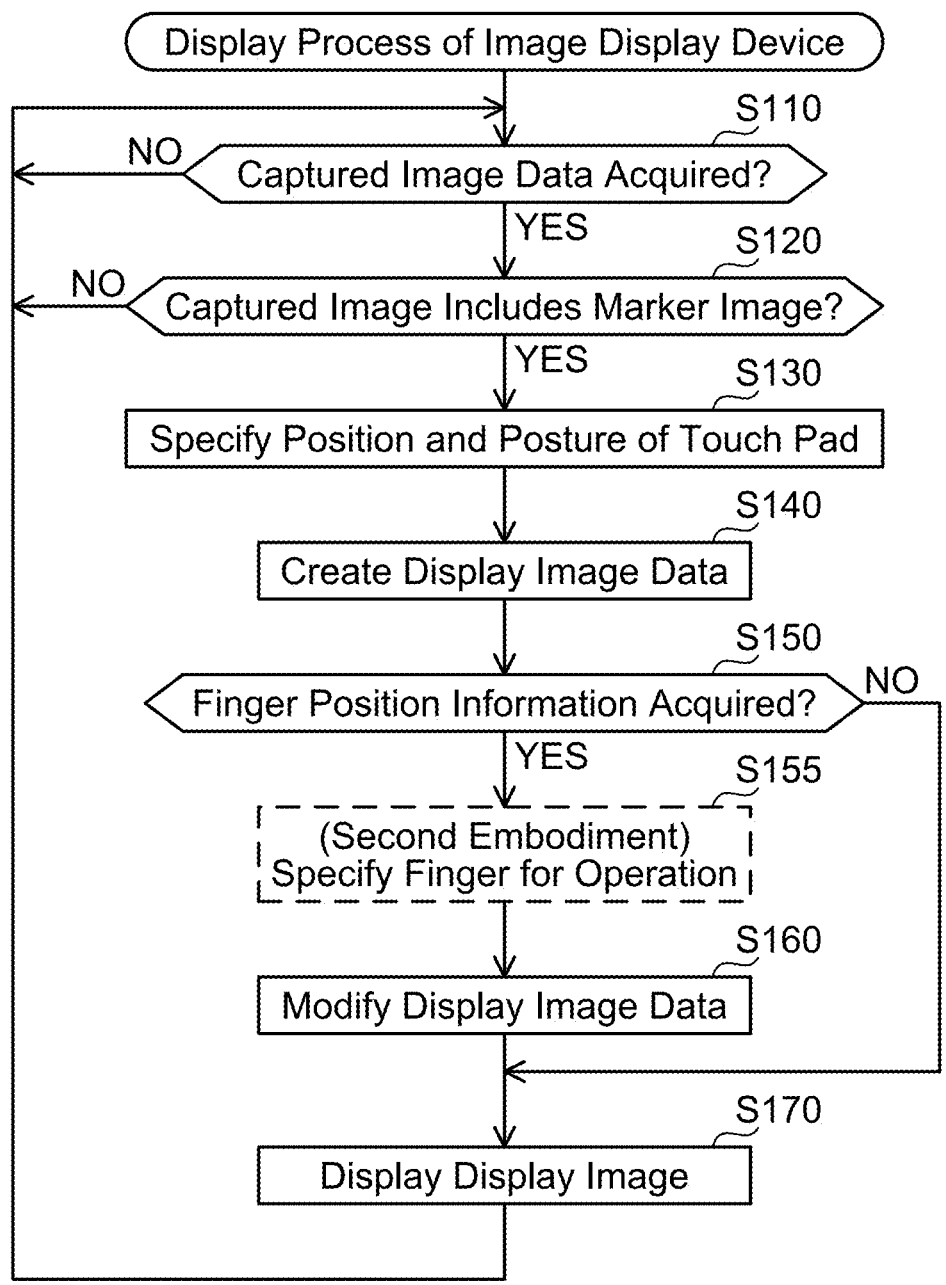
FIG. 7 shows a flowchart of a display process executed by a controller of the image display device.

(Display Process of Image Display Device 100; FIG. 7)

Next, the display process which the controller 130 of the image display device 100 executes will be described. When the power of the image display device 100 is turned on, the controller 130 starts the process of FIG. 7. In S110, the controller 130 monitors acquisition of captured image data from the cameras 116. When the captured image data are acquired (YES to S110), the controller 130 proceeds to S120.

In S120, the controller 130 determines whether or not a captured image indicated by each of the acquired captured image data includes at least one marker image among four marker images that indicate the four markers 40. When determining that the captured image includes at least one marker image (YES to S120), the controller 130 proceeds to S130. On the other hand, when determining that the captured image does not include any marker image (NO to S120), the controller 130 returns to S110. In a variant, the controller 130 may determine YES to S120 on condition that the captured image includes at least two marker images, may determine YES to S120 on condition that the captured image includes three or more marker images, or may determine YES to S120 on condition that the captured image includes all four marker images.

Figure 8:
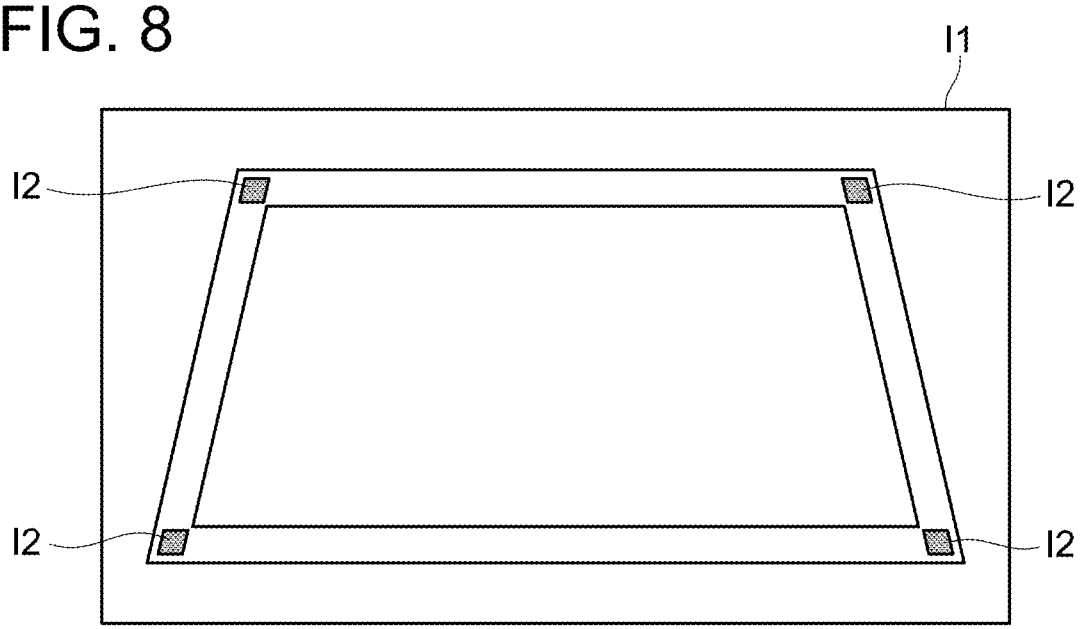
FIG. 8 shows an example of a captured image.

In S130, the controller 130 specifies a position and a posture of the touch pad 12 in the specific range (that is, in a captured range) based on position and posture of the marker image(s) in the captured image. FIG. 8 shows an example of a captured image I1 and marker images I2.

Figure 9:
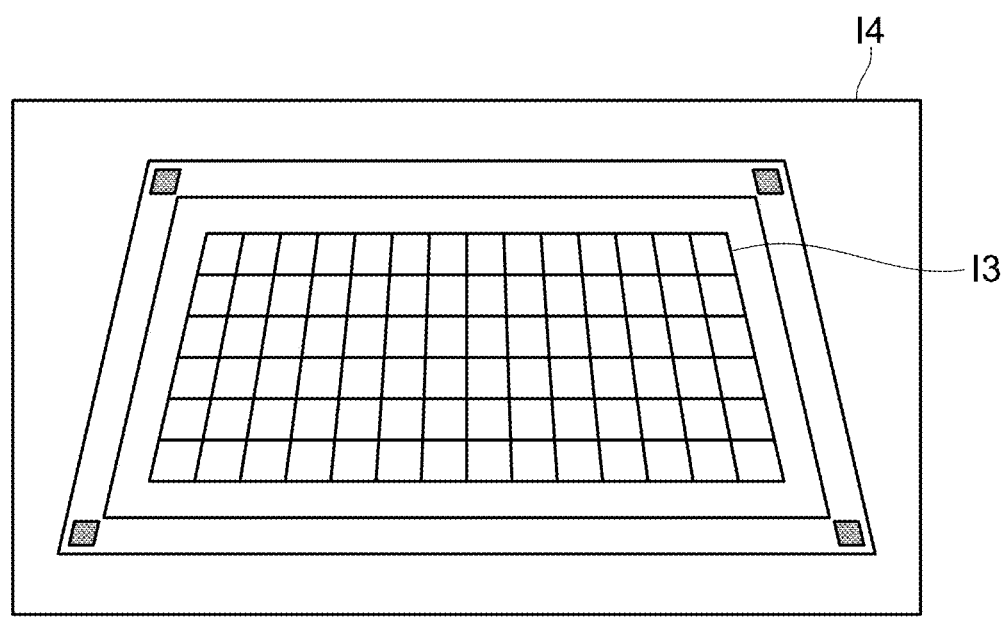
FIG. 9 shows an example of a display image.
Figure 10:
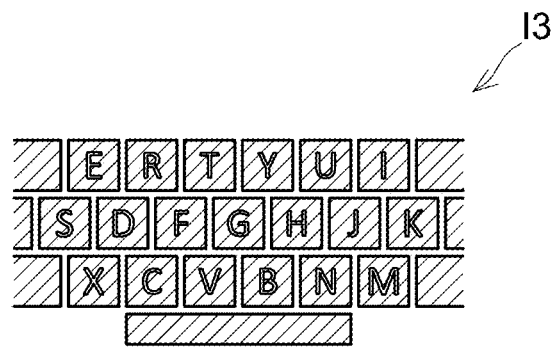
FIG. 10 shows an enlarged view of FIG. 9.

In S140, the controller 130 creates display image data representing a display screen including a panel image, which indicates a keyboard for the user to input an operation, based on the captured image data and the specified position and posture of the touch pad 12. In the display image, the panel image is arranged in a range corresponding to the position of the touch pad 12 in the specific range. FIG. 9 shows an example of a display image I4 including a panel image I3. The panel image I3 includes character images, however, the character images are omitted in FIG. 9. FIG. 10 shows an enlarged view of a part of the panel image I3. An operation panel indicated by the panel image I3 includes a plurality of buttons arranged adjacent to one another. The panel image I3 includes a plurality of button images corresponding to the plurality of buttons. Each button image corresponding to a character key includes one character image (such as "G"). Here, aside from alphabets such as "G", the characters in the character images may be hiragana, katakana, kanji, alphabets, numbers, symbols, and pictorial characters. Portions indicated by hatching are portions with a relatively high brightness, and portions other than the aforementioned (such as a portion surrounding the character "G") are portions with a relatively low brightness. It can also be said as that the portions with the relatively high brightness are portions with a high visibility to the user (that is, the display image thereof is bright and clear, which is easily recognized visually), and the portions with the relatively low brightness are portions with a low visibility to the user (that is, the display image thereof is more difficult to recognize visually).

In S150, the controller 130 determines whether or not the finger position information (see S40 of FIG. 4) was acquired from the operation device 10 through the communication I/F 120 within a predetermined period. The controller 130 proceeds to S160 when the finger position information was acquired from the operation device 10 within the predetermined period (YES to S150), and the controller 130 proceeds to S170 when the finger position information was not acquired from the operation device 10 within the predetermined period (NO to S150).

In S160, the controller 130 modifies the display image data based on the acquired finger position information. Specifically, the controller 130 sets the brightness in the panel image within a range corresponding to the relative position indicated by the finger position information (hereinbelow termed a "finger range") to be lower than the brightness in the panel image outside the finger range. Due to this, the visibility of the panel image within the finger range becomes lower than the visibility of the panel image outside the finger range.

Figure 11:
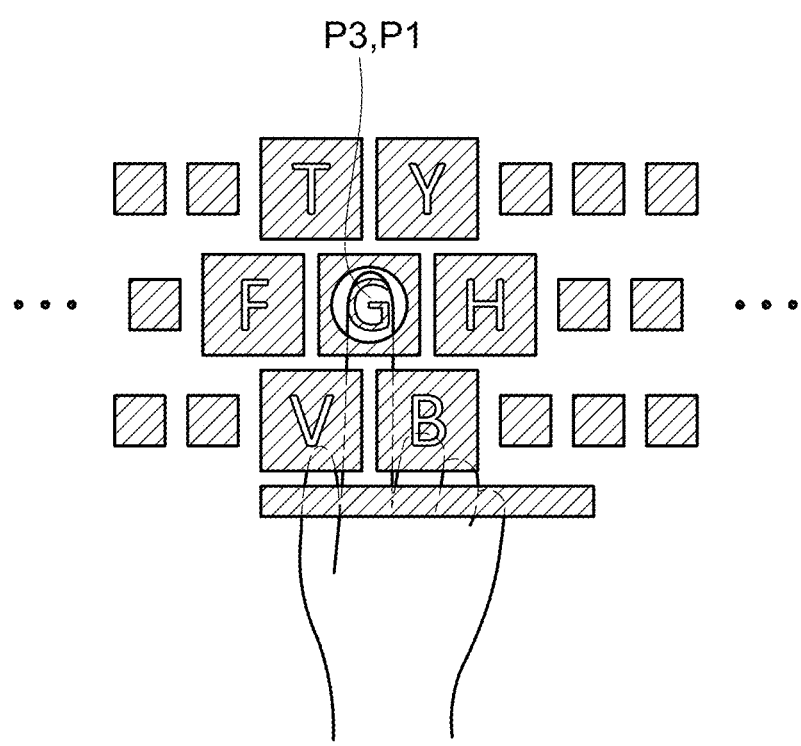
FIG. 11 shows a display screen of a case where one finger is detected.
Figure 12:
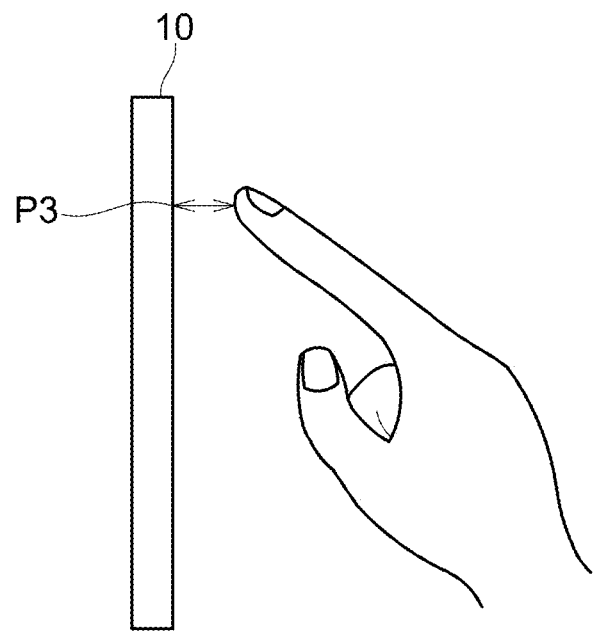
FIG. 12 shows the one finger corresponding to FIG. 11.

In S170, the controller 130 causes the display unit 114 to display a display image represented by the display image data. In a case where the display image data was modified in S160, a modified display image represented by the modified display image data is displayed in S170. FIG. 11 shows an example of the modified display image, and FIG. 12 shows the relative position P3 of the index finger corresponding to FIG. 11. In FIG. 11, in the finger range corresponding to the relative position P3, the brightness of the portion excluding the character "G" is set lower than its surrounding brightness. Due to this, the visibility of the image indicating the button "G" is set lower than the visibility of the images indicating the buttons adjacent to the button "G". At the portion with the low visibility, the user is capable of visually recognizing his/her own finger through this portion. On the other hand, at the portion with the high visibility, the user cannot visually recognize his/her own finger through this portion. That is, in the example of FIG. 11, the user can visually recognize a fingertip of his/her own index finger (see FIG. 12) through the portion with the low visibility at a center of the button "G". Further, the user cannot visually recognize his/her own finger or the like (such as a back of a hand) through other portions. However, in the example of FIG. 11, the portion of the character "G" in the image indicating the button "G" is visually recognizable due to its brightness being maintained despite being arranged in the finger range. That is, the user can visually recognize the portion of the character "G" without it being hidden by the finger. Since the character depicted on the button is not covered by the finger of the user, operability for the user is not hindered. Further, the image indicating the button "G" and the images of the buttons adjacent to this image are displayed larger than images surrounding them. Due to this, the user can easily acknowledge that a button which the user is intending to operate with the index finger is the button corresponding to "G", and the image indicating the button "G" can more easily be operated as compared to a case where the image indicating the button "G" is displayed small. In a variant, a mark indicating the finger may be displayed at the relative position P3 in the display image. Further, in another variant, the images of the buttons adjacent to the image indicating the button "G" may be displayed scattering radially with the image indicating the button "G" at a center. Further, when the relative position P3 is separated from the image indicating the button "G", the images of the adjacent buttons may be displayed by being restored to their original positions before their radial arrangement. When S170 is completed, the controller 30 returns to the monitoring in S110.

Figure 13:
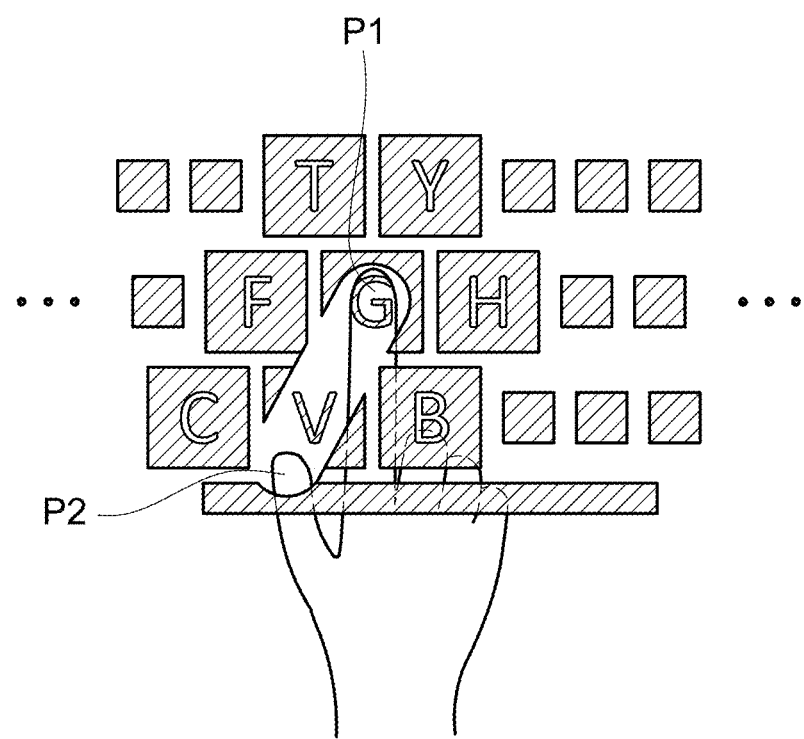
FIG. 13 shows a display image of a case where two fingers are detected.

FIG. 13 shows an example of the display image in a case where positions of two fingers are detected. Relative positions P1, P2 in FIG. 13 correspond respectively to the relative positions P1, P2 of the index finger and the thumb in FIG. 5. In FIG. 13, in each of finger ranges corresponding to the relative positions P1, P2, the brightness of a portion excluding the characters "G" and "V" is set lower than the brightness of its surrounding. Due to this, the visibility of the respective images indicating the buttons "G" and "V" is set lower than the visibility of the images indicating the buttons adjacent to the buttons "G" and "V". Further, in a range that is located between the finger ranges corresponding to the relative positions P1, P2, as well, the brightness is set lower than its surrounding brightness, thus the visibility thereof is set lower than its surrounding visibility. Further, the images indicating the buttons "G" and "V" are larger than the images indicating the buttons adjacent to the buttons "G" and "V".

Figure 14:
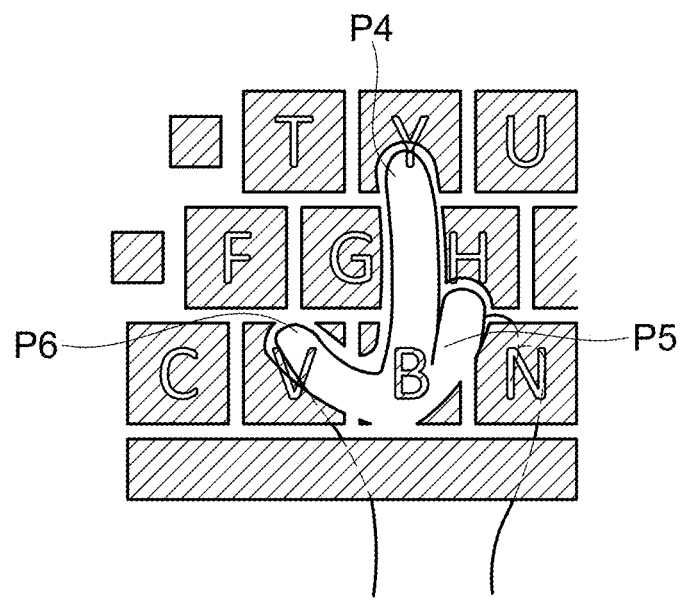
FIG. 14 shows a display image of a case where three fingers are detected.
Figure 15:
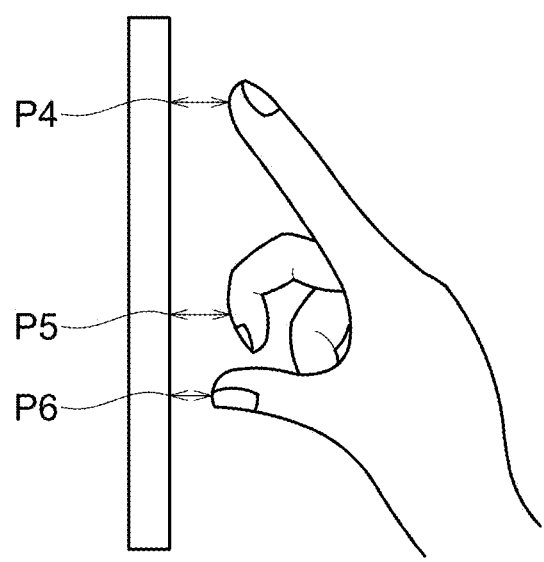
FIG. 15 shows the three fingers corresponding to FIG. 14.

FIG. 14 shows an example of the display image in a case where positions of three fingers are detected, and relative positions P4 to P6 of the index finger, a middle finger, and the thumb corresponding to FIG. 14 are shown in FIG. 15. Postures of the fingers in FIG. 15 are postures for the user to perform an operation to enlarge or shrink an object in the display image (so-called pinch-out and pinch-in). In FIG. 14, in finger ranges corresponding to the relative positions P4 to P6, the brightness of the panel image is set lower than their surrounding brightness. Further, in ranges connecting the relative positions P4 to P6 as well, the brightness is set lower than their surrounding brightness, and the visibility thereof is set lower than their surrounding visibility.

Figure 16:
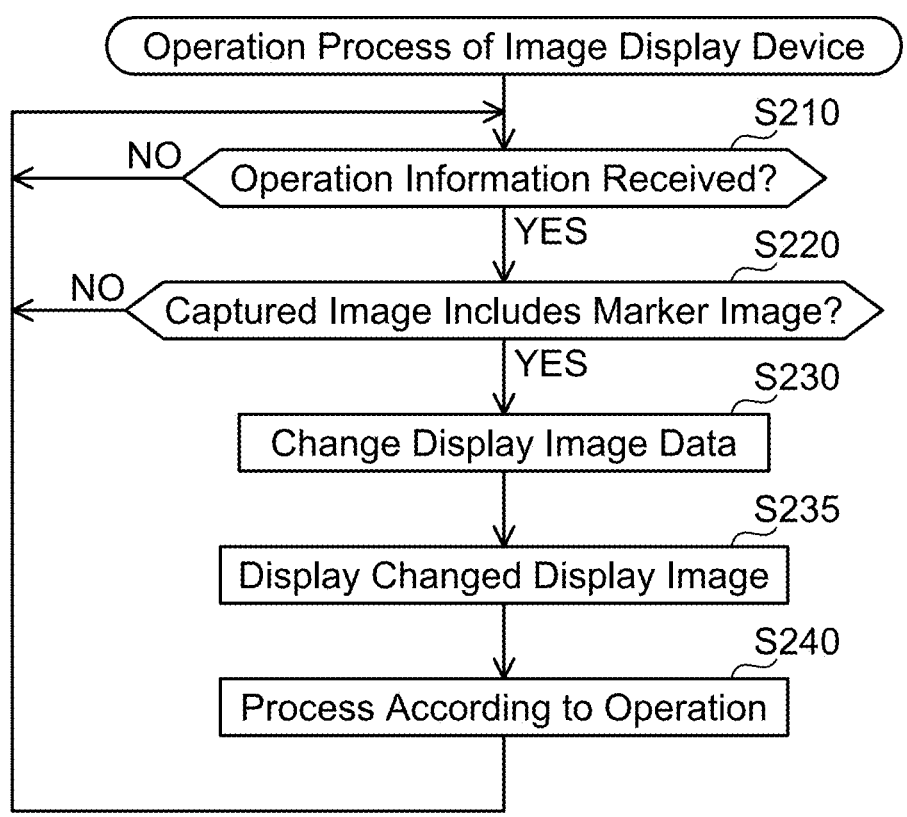
FIG. 16 shows a flowchart of a process upon operating the image display device.

(Operation Process of Image Display Device 100; FIG. 16)

Next, the operation process which the controller 130 of the image display device 100 executes will be described. In S210, the controller 130 monitors the operation information being received from the operation device 10 (see S30 of FIG. 4) through the communication I/F 120. The controller 130 proceeds to S220 when determining that the operation information is received from the operation device 10 through the communication I/F 120 (S210). S220 is same as S120 in FIG. 7.

In S230, the controller 130 changes the display image data to create changed display image data representing a changed display image. Specifically, the controller 130 specifies the button that was operated in the display image (hereinbelow termed a "target button") based on the relative position(s) included in the operation information, and creates display image data representing a display image in which the color of the image indicating the specified target button is changed.

Figure 17:
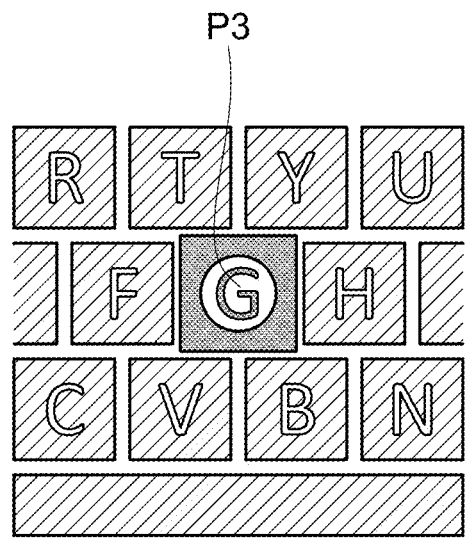
FIG. 17 shows how a color of an operated button changes.

In S235, the controller 130 causes the display unit 114 to display the changed display image. FIG. 17 shows how the color of the image indicating the target button "G" is changed. In S230, the controller 130 executes a process according to an operation inputted to the target button. When S240 is completed, the controller 130 terminates the process of FIG. 16.

(Effects)

An image display system of a comparative example that detects a region of a finger of a user based on a captured image is assumed. In the image display system of the comparative example, the image display device extracts a region with a color of the finger (such as pale orange in a case with yellow race) included in the captured image as the region of the finger, superposes a display image in which visibility of the region with the color of the finger is lower than visibility of other regions on a touch pad 12 and displays the same. In the comparative example, if the touch pad 12 is of a color close to the color of the finger, a region of the touch pad 12 is erroneously detected, and visibility of the region corresponding to the touch pad 12 may be set low. Due to this, the color of the touch pad 12 is restricted. Further, for example, when an apparent color of the finger differs from a predetermined color of the finger, such as when the user is wearing a glove, there is a possibility that the region of the finger cannot be detected. Due to this, it is difficult to implement the aforementioned image system to work which requires wearing gloves.

On the other hand, the image display device 100 of the present embodiment displays the display image based on the captured image data and the relative position of the finger detected by the operation device 10 (S170 of FIG. 7). In the display image, the visibility of the panel image in the range corresponding to the relative position is lower than the visibility of the panel image outside the range (FIG. 11). As above, the user can visually recognize his/her finger through the portion with the low visibility. To the contrary, the user cannot visually recognize his/her finger through the portion with the high visibility. The user can acknowledge the position of the finger (such as the index finger in FIG. 12) which the user is bringing close to the touch pad 12 while looking at the panel image. Since the relative position of the finger relative to the touch pad 12 is detected by the operation device 10 not being based on the color of the fingers, the color of the touch pad 12 is not restricted. Further, since the apparent color of the finger may be any color, the image display system 2 of the present embodiment may be employed in work that requires wearing gloves, for example. That is, design restrictions on the image display system 2 can be reduced.

Further, in the present embodiment, as shown in FIG. 13, when the relative positions P1, P2 of two fingers are detected, the visibility of the panel image in the ranges corresponding to the relative positions P1, P2 of the two fingers is set lower in the display image than the visibility of the panel image outside the ranges. The user who sees the display image can visually recognize his/her two fingers through the portions with the low visibility. As such, the user who sees the display image can easily image the positions of his/her two fingers within the display image. The user can perform an operation while acknowledging the respective positions of his/her two fingers. Due to this, the operability for the user to perform an operation on the touch pad 12 is improved.

Further, in the present embodiment, as shown in FIG. 11, etc., each of the character images is visually recognizable regardless of whether it is arranged within the range corresponding to the relative position P3 of the finger. Due to this, the user can visually recognize the character image without it being hidden by the finger. Since the character image is not hidden by the finger of the user, the operability for the user is not hindered.

Further, in the present embodiment, as shown in FIG. 17, the color of the image indicating the operated button "G" is changed. Due to this, the user can easily recognize which one of the plurality of buttons was operated.

Further, in the present embodiment, the image display system 2 creates the display image data representing the display image by using the position and posture of the touch pad 12 (S140 of FIG. 7), and displays the display image in a form matching the position and posture of the touch pad 12 (S170). Due to this, the user can see the panel image that accords with how the touch pad 12 is seen.

Further, since the position and posture of the touch pad 12 cannot be specified based on the position and posture of the marker image(s) when the captured image does not include the marker images (NO to S120 of FIG. 7), there is a possibility that the panel image cannot be suitably arranged in the range corresponding to the position of the touch pad 12. That is, there is a possibility that the panel image is arranged by being displaced relative to the touch pad 12. In the image display device 100, even when the operation information is acquired (YES to S210 of FIG. 16), the operation is not executed when the captured image does not include the marker images (NO to S220), so an erroneous operation can be suppressed.

Corresponding relationships of the present embodiment and the claims will be described. The index finger and the thumb in FIG. 5 are respectively an example of a "first finger" and a "second finger". The button "G" in FIG. 11 is an example of a "specific button".

Second Embodiment

Features that differ from the first embodiment will be described. In this embodiment, when a plurality of finger position information corresponding to plural fingers is acquired in S150, the controller 130 specifies a finger which is most highly likely to be used for the operation from among the plural fingers in S155 of FIG. 7. Specifically, the controller 130 specifies the finger with a smallest coordinate in the height direction (that is, being closest to the touch pad 12) as indicated by the finger position information from among the plural fingers. In the example of FIG. 5, the index finger closer to the touch pad 12 is specified from between the thumb and the index finger. When only the finger position information corresponding to one finger is acquired in S150, the controller 130 specifies this one finger.

In S160, the controller 130 modifies the display image data based on the finger position information corresponding to the finger specified in S155. Specifically, the controller 130 sets the brightness of the panel image in the finger range corresponding to the relative position indicated by the specified finger position information to be lower than the brightness of the panel image outside the finger range. By doing so, the visibility of the panel image in the first finger range corresponding to the finger which is most highly likely to be used for the operation becomes lower than the visibility of the panel image outside the first finger range. Further, the visibility of the panel image in the second finger range corresponding to the finger which is less likely to be used for the operation becomes equal to the visibility of the panel image outside both the first and second finger ranges. For example, the display image of FIG. 11 is displayed according to the postures of the fingers in FIG. 5. In the panel image in the first finger range with the low visibility (which is a periphery of the relative position P1 in the example of FIG. 11), the user can visually recognize his/her finger through the panel image. To the contrary, in the panel image with the high visibility outside the first finger range, the user cannot visually recognize his/her finger through the panel image. Due to this, regardless of the positional relationships of the respective fingers of the user relative to the touch pad 12, the user can perform the operation while visually recognizing the ranges other than the first finger range corresponding to the finger which is most highly likely to be used for the operation in the panel image. Due to this, the visibility of the panel image is suppressed from being excessively reduced by the respective fingers of the user, and the operability for the user is improved.

Effects of Second Embodiment

In this embodiment as well, the design restrictions on the image display system 2 can be reduced similar to the first embodiment. Further, in the present embodiment, since the visibility of the panel image is changed for the plural fingers according to the possibility of their usage in the operation, the user who sees the display image can easily imagine the positions of the fingers relative to the touch pad 12, and the operability for the user is improved. Further, since the visibility of the panel image in the range corresponding to the finger which is less likely to be used in the operation is not set low, the panel image can easily be seen.

Third Embodiment

Features that differ from the first embodiment will be described. In this embodiment, the controller 130 modifies the display image data by changing the panel image in the finger range to a single color of black in S160 of FIG. 7, and causes the display unit 114 to display the display image represented by the modified display image in S170. Due to this, the visibility of the panel image in the finger range becomes lower than the visibility of the panel image outside the finger range. The user can visually recognize his/her finger through the portion indicated by the single color of black. In this embodiment as well, the design restrictions on the image display system 2 can be reduced.

Fourth Embodiment

Features that differ from the first embodiment will be described. In this embodiment, the controller 130 modifies the display image data by setting a saturation of the panel image in the finger range to be lower than a saturation of the panel image outside the finger range in S160 of FIG. 7, and causes the display unit 114 to display the display image represented by the modified display image in S170. Due to this, the visibility of the panel image in the finger range becomes lower than the visibility of the panel image outside the finger range. The user can visually recognize his/her finger through the portion with the low saturation. In this embodiment as well, the design restrictions on the image display system 2 can be reduced.

Fifth Embodiment

Features that differ from the first embodiment will be described. In this embodiment, the controller 130 modifies the display image data by trimming the panel image in the finger range in S160 of FIG. 7, and causes the display unit 114 to display the display image represented by the modified display image in S170. Due to this, the visibility of the panel image in the finger range becomes lower than the visibility of the panel image outside the finger range. The user can visually recognize his/her finger through the trimmed portion. In this embodiment as well, the design restrictions on the image display system 2 can be reduced.

The embodiments have been described in detail above, however, these are mere exemplary indications and thus do not limit the scope of the claims. The technique described in the claims includes modifications and variations of the specific examples presented above. For example, variants as below may be employed.

(Variant 1) In each of the aforementioned embodiments, the display units 114 of the image display device 100 are translucent displays. Not being limited hereto, the display units 114 of the image display device 100 may be light blocking displays, and may block a view of the user when the user wears the image display device 100. In this case, the controller 130 may cause the display units to display camera images captured by the cameras 116 (that is, images corresponding to the range of view of the user). Further, in the display process (see FIG. 7), the controller 130 may cause the display images to be superposed and displayed on the camera images displayed on the display units 114.

Figure 18:
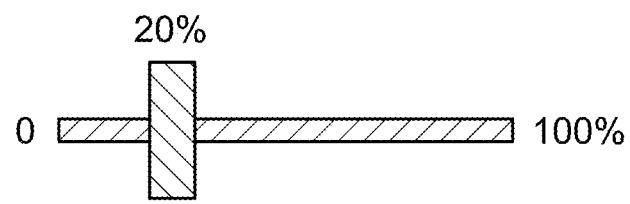
FIG. 18 shows a panel image indicating a slider.
Figure 19:
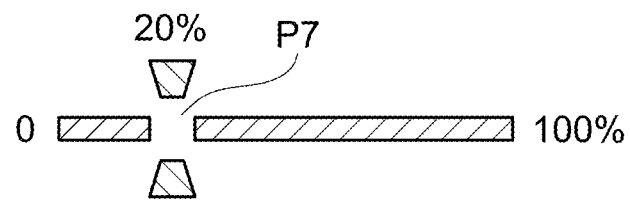
FIG. 19 shows the panel image when the slider is operated.

(Variant 2) In each of the aforementioned embodiments, the panel image is the image indicating the keyboard, however, in a variant, it may be an image indicating a slider for adjusting the brightness and the like of the image as shown in FIG. 18. In FIG. 19, a relative position P7 of a finger is included in the panel image indicating the slider, and the visibility of the panel image in a finger range corresponding to the relative position P7 of the finger is set lower than the visibility of the panel image outside the finger range. Further, a shape of the panel image is changed. That is, the "operation panel" may not only be a keyboard, but may include a slider or the like. Further, the "panel image" may not include a character image. Further, the "operation panel" may not include the plurality of buttons arranged adjacent to one another.

(Variant 3) In each of the aforementioned embodiments, the color of the image indicating the operated button is changed, however, in a variant, for example, only the operated button may be displayed larger than its surrounding buttons and a shape thereof may be changed, the operated button may be given a shade effect, and the buttons adjacent to the image indicating the operated button may scatter to the periphery thereof. That is, a "displayed form" may include various configurations related to a size, a shape, an emphasizing effect.

(Variant 4) In a variant, the operation device 10 may not comprise the markers 40 and the image display device 100 may omit S120 of FIG. 7, and may specify the position and posture of the touch pad 12 in S130 based on a contour of the image indicating the operation device 10 within the captured images, for example. That is, the "operation device" may not comprise a marker.

(Variant 5) The image display device 100 may omit S220 of FIG. 16 and proceed to S230. That is, a "specific process executing unit" may execute a specifying process in a case where specific operation information is acquired while the display image is displayed, even if the captured image does not include the marker image.

(Variant 6) In each of the aforementioned embodiments, the image display device 100 has a substantially glasses-like frame, and is configured to be worn on the head of the user similarly to wearing glasses. Not being limited hereto, the image display device may have an arbitrary support frame in shapes such as a hat or a helmet, so long as it can be worn on the head of the user.

(Variant 7) The image display device may be configured by attaching its components such as the cameras and the control box to an eyewear (glasses, sunglasses) that is generally used for a vision correction purpose or a protection of the eyes. In this case, lens portions of the eyewear may be used as the display units.

(Variant 8) In the aforementioned embodiments, the image display device 100 includes two cameras, namely the right camera 116R and the left camera 116L, however, a number of the cameras may be one. Further, the image display device 100 may include only one of the right display unit 114R and the left display unit 114L.

Further, the technical features described in the description and the drawings may technically be useful alone or in various combinations, and are not limited to the combinations as originally claimed. Further, the technique described in the description and the drawings may concurrently achieve a plurality of aims, and technical significance thereof resides in achieving any one of such aims.

The invention claimed is:

1. An image display system comprising an operation device and an image display device communicably connected with the operation device,
wherein the operation device comprises:
    a body;
    a pad comprising a pad sensor, wherein the pad sensor is exposed on a surface of the body and configured to sense an operation inputted by a finger of a user;
    an operation device controller; and
    an operation device memory unit, wherein the operation device memory unit is configured to store instructions that, when executed by the operation device controller, cause the operation device controller to:
        detect a first relative position of a first finger of the user relative to the pad sensor; and
        send first position information indicating the first relative position detected by the pad sensor and operation information indicating the operation inputted to the pad sensor to the image display device;
wherein the image display device comprises:
    a frame wearable on a head of the user;
    a display unit mounted on the frame and arranged on a position facing an eye of the user wearing the frame;
    a camera configured to capture a specific range corresponding to a view range of the user; and
    a display-side controller, comprising:
    a display-side memory unit configured to store the first position information and the operation information from the operation device, wherein the display-side memory unit is further configured to store instructions that, when executed by a display controller, causes the display controller to:
    create display image data representing a display image including a panel image indicating an operation panel for inputting a specific operation, based on captured image data representing a captured image within the specific range and the first relative position indicated by the acquired first position information, wherein in the display image, the panel image is arranged in a range corresponding to a position of the pad within the specific range, and a visibility of the panel image within a first range corresponding to the first relative position of the first finger is lower than the visibility of the panel image outside the first range;
    cause the display unit to display the display image represented by the display image data; and
    execute a specific process according to the specific operation in a case where specific operation information is acquired while the display image is displayed, the specific operation information indicating that an input of the specific operation has been accepted on the pad.

2. The image display system as in claim 1, wherein
the operation device memory unit is further configured to store instructions, that when executed by the operation-device controller causes the operation-device controller to:
    detect a second relative position of a second finger of the user relative to the pad sensor; and
    send second position information indicating the second relative position detected by the pad to the image display device; and
the display-side memory unit is further configured to store instructions that, when executed by the display-side controller causes the display-side controller further to:
    acquire the second position information from the operation device; and
    create the display image data based on the captured image data, the first relative position, and the second relative position indicated by the acquired second position information, wherein
in the display image, the visibility of the panel image within the first range and a second range corresponding to the second relative position of the second finger is lower than the visibility of the panel image outside both the first range and the second range.

3. The image display system as in claim 1, wherein
the operation device memory unit is further configured to store instructions that, when executed by the operation device controller, cause the operation device controller to:
    detect a second relative position of a second finger of the user relative to the pad; and
    send second position information indicating the second relative position detected by the pad to the image display device;
the display-side memory unit is further configured to store instructions that, when executed by the display-side controller causes the display-side controller further to:
    acquire the second position information from the operation device;
    specify the first finger that is more likely to be used for an operation from among the first finger and the second finger based on the first position information and the second position information; and
wherein, in the display image, the visibility of the panel image within a second range corresponding to the second relative position of the second finger that is not specified is equal to the visibility of the panel image outside both the first range and the second range.

4. The image display system as in claim 1, wherein
the display unit is constituted of a translucent material, and
the display-side memory unit is further configured to store instructions that, when executed by the display-side controller causes the display-side controller further to:
    create the display image data satisfying at least one of following conditions:

(a) a brightness of the panel image within the first range is lower than the brightness of the panel image outside the first range;
(b) the panel image within the first range is displayed in a single color of black;
(c) a saturation of the panel image within the first range is lower than the saturation of the panel image outside the first range; and
(d) the panel image within the first range is trimmed.

5. The image display system as in claim 1, wherein
the panel image includes one or more character images associated with the operation panel, and
in the display image, the one or more character images are displayed in a visible form regardless of whether the one or more character image are arranged within the first range or not.

6. The image display system as in claim 1, wherein
the operation panel includes a plurality of buttons arranged adjacent to each other, and
the panel image includes a plurality of button images corresponding to the plurality of buttons.

7. The image display system as in claim 6, wherein
among the plurality of buttons in the display image, a visibility of an image indicating a specific button arranged at the first relative position is lower than a visibility of an image indicating a button adjacent to the specific button.

8. The image display system as in claim 6, wherein
the specific operation includes an operation for selecting a specific button from among the plurality of buttons, and
the display-side memory unit is further configured to store instructions that, when executed by the display-side controller causes the display-side controller further to:
change the display image data in a case where the specific operation information is acquired while the display image is displayed so as to create changed display image data representing a changed display image, and in the changed display image, a displayed form of an image representing the specific button has been changed.

9. The image display system as in claim 1, wherein
the operation device further comprises a marker arranged on a surface of at least one of the body and the pad;
the display-side controller further comprises a position specifying unit, in a case where the captured image includes a marker image indicating the marker, configured to specify a position and a posture of the pad within the specific range based on a position and a posture of the marker image in the captured image; and
the display-side memory unit is further configured to store instructions that, when executed by the display-side controller causes the display-side controller further to:
in the case where the captured image includes the marker image, create the display image data based on the captured image data, the first relative position, and the specified position and posture of the pad.

10. The image display system as in claim 9, wherein
the display-side memory unit is further configured to store instructions that, when executed by the display-side controller causes the display-side controller further to:
even in a case where the specific operation information is acquired while the display image is displayed, not execute the specific process in a case where the captured image does not include the marker image.

* * * * *